March 18, 1924.

H. HANSSON

CALCULATING DEVICE

Filed Aug. 31, 1922 — 2 Sheets-Sheet 1

1,487,460

Inventor:
H. Hansson.

March 18, 1924.                                                         1,487,460
H. HANSSON
CALCULATING DEVICE
Filed Aug. 31, 1922            2 Sheets-Sheet 2

Inventor:
H. Hansson
By
Langner, Parry, Card & Langner
Attys.

Patented Mar. 18, 1924.

1,487,460

UNITED STATES PATENT OFFICE.

HALVOR HANSSON, OF CHRISTIANIA, NORWAY.

CALCULATING DEVICE.

Application filed August 31, 1922. Serial No. 585,546.

*To all whom it may concern:*

Be it known that I, HALVOR HANSSON, a subject of the King of Norway, residing at Generalstaben, Christiania, Norway, have invented certain new and useful Calculating Devices, of which the following is a specification.

My invention relates to apparatus for the graphic determination of the value of quantity $x$ depending on variable quantities $s$, $t$, $u$, $v$, ... etc., in any number, by virtue of an equation of the form, $$f(x) = f_1(s) \cdot f_2(t) \cdot f_3(u) \cdot f_4(v) \ldots$$

i. e., when a function of any form of the unknown quantity $x$ is equal to the product of functions of any form of the different variables $s$, $t$, $u$, $v$, ...

The following description and accompanying drawings given by way of example set forth the principal of the apparatus for the graphic determination according to the invention, as well as two forms of construction of apparatus for obtaining the solution of particular problems, together with details of the same.

Figure 5:
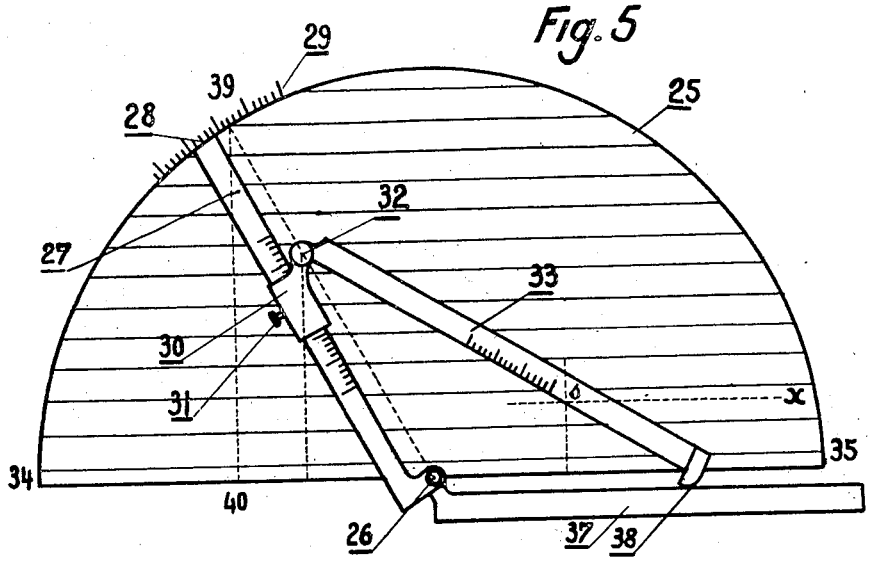

Fig. 5 shows a calculating device for topographical observations, and this apparatus at once gives the corrections for the measured sighting angles in order to bring these angles to the proper points. These corrections are required by reason of the fact either that the sighting instrument is situated at a distance from the signal, or that the sighted signal is at a certain distance from the point for which it serves as a checking point.

Figure 4:
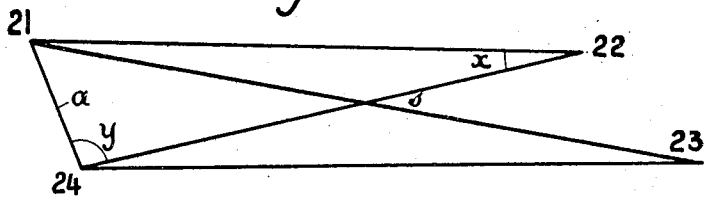

Fig. 4 is a diagram indicating the last said calculations.

Figure 6:
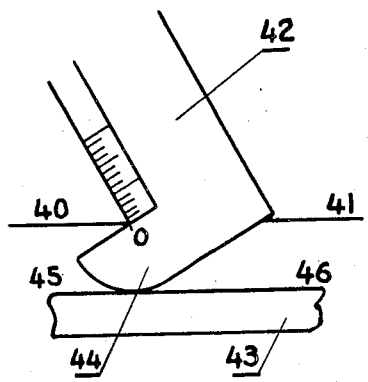
Figure 7:
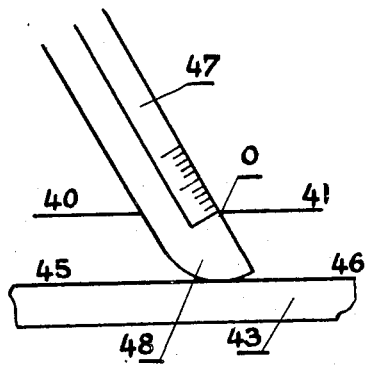

Figs. 6 and 7 represent details of construction.

Figure 1:
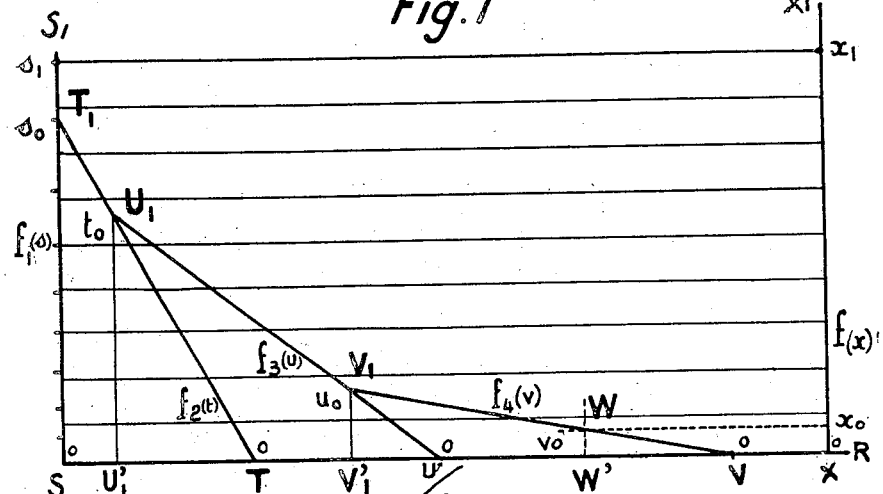
Fig. 1 is a diagram showing the principal of the apparatus and Fig. 1ª is a modification of the same.

According to Figure 1 starting from a point X on a straight line SR which represents the zero point, there is placed upon the vertical line $XX_1$, the scale of the function $f(x)$, i. e., the values of $f(x)$ are determined for different values of $x$, as for example, regularly increasing values, and these are marked on the line $XX_1$. Starting from the zero at X, divisions, which equal, or correspond to, the various determined values of $f(x)$ are marked off. Opposite said divisions are placed the corresponding values of $x$ and then through these divisions, straight lines are drawn parallel to SR. This will afford a series of lines relative to the function $f(x)$.

Upon another vertical lines $SS_1$, is formed in like manner, by starting from the point S as zero, the scale of the function $f_1(s)$. On the line $TT_1$, which is movable with its ends situated on the lines SR and $SS_1$, the scale of the function $f_2(t)$ is drawn, starting from the point T as zero. On the line $UU_1$ which is movable with its ends in lines TR and $TT_1$, is drawn the scale of the function $f_3(u)$, starting from the point U as zero. On the line $VV_1$ which is movable with its ends in lines UR and $UU_1$, is drawn the scale of the function $f_4(v)$ starting from the point V as zero, and likewise for further functions.

The maximum values $x_1$, $s_1$, $t_1$, $u_1$, $v_1$, of these scales are connected by the relations—

$$f(x_1) = f_1(s_1) \cdot f_2(t_1) \cdot f_3(u_1) \cdot f_4(v_1) \ldots$$

It will be further shown that in order to find the value $x_0$ of the unknown quantity corresponding to a group of values $s_0$, $t_0$, $u_0$, $v_0$ of the variable quantities it will suffice to locate the end $T_1$ of the line $TT_1$ at the point $s_0$ of the scale $SS_1$; the end $U_1$ of line $UU_1$ at the point $t_0$ of the scale $TT_1$, the end $V_1$ of the line $VV_1$ at the point $U_0$ of the scale $UU_1$, and to read the value $x_0$ on the line parallel to SR, of the series of $x$, which passes through the point $v_0$ of the scale $VV_1$.

The scale of the function $f_1$, $(s)$ shown in Fig. 1 on the line $SS_1$ perpendicular to the series $f(x)$ can also (and this is advantageous in certain cases as will be further shown by a particular example) be drawn as in Fig. 1ª upon a given line $S'S'_1$, straight or curved, and having its origin upon SR and upon which the divisions of $SS_1$ are marked parallel to SR. It is observed in fact that if one places the scale $f_2(t)$ at $T'T'_1$ so that $T'$ shall be situated upon SR and $T'_1$ upon the division $S_0$ of $S'S'_1$, this scale will remain parallel to its position $TT_1$ so that the remainder of the construction is made without change.

Figure 3:
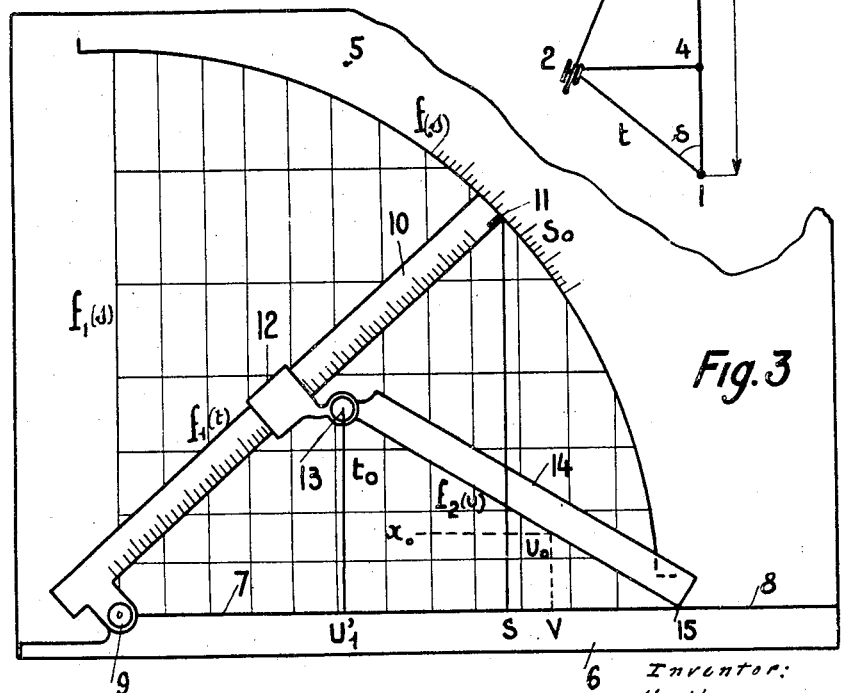
Fig. 3 shows a calculating device for computing artillery fire on an invisible target directed from an observation post, and this apparatus gives at once and for each firing piece the distance from the target and the direction of arm.

The apparatus indicated in Fig. 3 is intended for artillery firing calculations, and it is used to determine the distance of the target and the angle of aiming for each piece of artillery for firing upon an invisible target as directed from an observation post from which the target can be observed.

Figures 1A, 2:
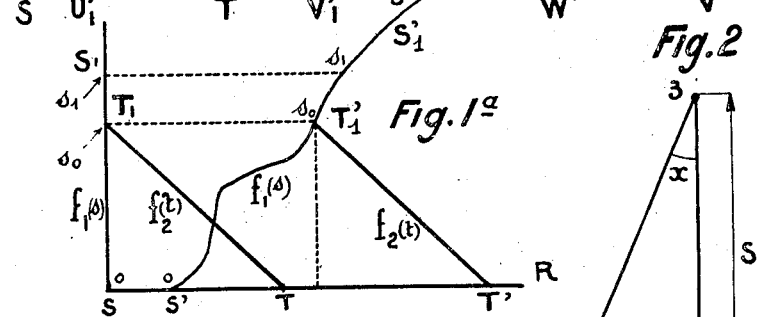
Fig. 2 is a general diagram indicating the calculations for the same.

According to the diagram of Fig. 2, the observation post is situated at 1, the piece of artillery at 2 and the target at 3. In the triangle 1, 2, 3 the side 1, 2 is known and is designated by $t$; the angle 2, 1, 3 is known and is designated by $s$, and the approximate distance 1, 3 is known and is designated by S. To determine the angle 1, 2, 3 by which to indicate to the piece 2 its direction of aim, it suffices to calculate the angle X. If from the point 2 the perpendicular 2, 4 be drawn to the line 1, 3, there is obtained in the triangle 2, 4, 3

$$\tan x = \frac{2.4}{3.4} \cdot \frac{t \sin s}{S - t \cos s} \quad \sin s \cdot t \cdot \frac{1}{S - t \cos s}$$

By the equation $\frac{1}{S - t \cos s} = \frac{1}{u}$, $u$ can be separately calculated.

This affords, $\tan x = \sin s \cdot t \cdot \frac{1}{u}$.

This formula which gives $x$ has the above-indicated form $f(x) = f_1(s) \cdot f_2(t) \cdot f_3(u)$.

According to the principle above described, this equation can be solved by the apparatus shown in Fig. 3. This apparatus consists of a board 5 having secured to the lower part thereof the rule 6 whose upper edge 7, 8 represents the zero line of the series of the function. On this line at 9 is a screw which forms the pivot of a small rule 10 containing a scale of the distances $t$ from the observation post to the piece. The end 11 of this rule moves upon a circular line having its center at 9 and whereupon are marked the angles $s$, and the scale upon said circle is that of the sine function, and hence the graduation in angles is regular. On the small rule is slidable a slide 12 supporting an axle 13 which is situated at the same distance from the edge of the rule as the pivot 9. The pivot 13 carries a second rule 14 whose lower edge passes through the pivot 13 and which is graduated from the end 15 according to the function $\frac{1}{u}$, giving successively to $u$ the values of increasing whole numbers.

To make use of the apparatus, the operation is performed as follows. The slide 12 is moved upon the small rule 10, until its lower edge comes upon the division corresponding to the distance $t$ from the observation post 1 to the piece 2. The rule 10 is so disposed that its mark 11 will be brought upon the division of the circle which represents the value $s$ of the angle $a$, 1, 3, and the rule 14 is disposed so that its end 15 will come upon the upper edge 7, 8 of the rule 6, the whole device being in this position, one observes which line of the series passes through the division $U_0$ of scale 14, and reads this line the value $x_0$ which was to be found.

The apparatus shown in Fig. 5 is intended for a rapid determination, by a simple reading of the corrections, of sighting angles in making topographical observations when such observations, as is generally the case, cannot be made by placing observing apparatus exactly above the point to which these angles are to be referred, or when the signal which is sighted is at some distance from the point for which it serves as a reference mark.

In Fig. 4, 21 is a point, and 22, 23 different points of the ground to be observed. The apparatus for measuring the angles is disposed at 24 at a distance $a$ from the point 21. In one of the sighting triangles 24, 21, 22, let S be the distance 21, 22 and $y$ the angle measured between the sighted mark 21 and the observed point 22, and $x$ the angle to be calculated. We then have the equation $$\sin x = \frac{a \sin y}{S}$$

that is, $\sin x = \sin y \cdot a \cdot \frac{1}{S}$, which is in fact an equation having the form $F^s(x) = f_1(s) \cdot f_2(t) \cdot f_3(u)$.

The graphic solution of this equation is given by an apparatus which is analogous to the preceding. To a semicircular board 25, Fig. 5 is pivoted at the center 26, a rule 27 whose end 28 is provided with a mark and is caused to move upon a circular graduated scale 29. The rule 27 has slidable thereon, a slide 30 having the set screw 31 and supporting an axle 32 disposed at the same distance from the edge of the rule 27 as the pivot 26. At 32 is pivoted a second rule 33 whose lower edge passes through the center of the pivot 32. On the board 25 is formed a series of lines representing the scale of the sine function of the angles of the graduation 29 and whereof the line O shown at 34, 35 passes through the center of the pivot 26. Parallel to, and somewhat below, this line, is mounted a rule 37, and on the upper edge of the same bears the end of a rule 33 which is constituted by a rounded nose 38 so that the zero mark of the scale of the rule 33 will always remain upon the line 34, 35. The rule 27 is graduated in distances, starting from the point 26. The rule 33 is graduated according to the scale of the function $\frac{1}{S}$, or according to its logarithm.

The said apparatus is employed in the following manner. The slide 30 is placed on the division corresponding to the distance measured between the point in question and the observing apparatus, and the rule 27 is so disposed that its mark 28 registers with the division corresponding to the measured angle $y$, and the end 38 of the rule 33 is brought against the upper edge of the rule 37. Under these conditions, the division of the rule 33 marked S is situated on the line of the series marked $x$, $x$ being the value of the unknown quantity sought.

The series $x$ is graduated in seconds of angle according to regularly increasing values. Should it be required to correct a great number of observations made upon a given point, the value $a$ will remain constant and the sighting angles will vary in a regular manner, so that the apparatus is readily operated by passing from one observation to another, in each case observing on the rule 33 the value S corresponding to the distance, in question and reading on the series opposite this point of the scale, the value of $x$ which is sought.

If the equation to be solved contains only two factors in the second part, as, $$f(x) = f_1(s) \cdot f_2(t)$$

the apparatus can have a very simple construction. It can comprise the parallel series representing the scale of the function $f(x)$, a scale of the function $f_1(s)$ which is to be placed upon a circular line as in the apparatus of Figs. 3 and 5, and a movable radius such as 10 or 27, carrying the scale of the function $f_2(t)$.

Figs. 6 and 7 show two dispositions which admit of coincidence between the base line 40, 21 and the zero point of the scale of a rule which bears upon the upper edge 45, 46 of a guiding rule 43. The edge of the rule 42, Fig. 6, carrying the scale, is provided with a nose 44 having the form of a quarter circle whose center is the zero point of the scale, and whose radius is the distance between the base line 40, 41 and the guiding edge 45, 46. In Fig. 7, the graduated scale is placed upon the upper edge of the rule 47 and the lower end is rounded as at 48 in the form of a quarter circle whose center is the zero point of the scale, and the radius the distance between the base line 40, 41 and the guiding edge 45, 46.

What I claim is:

1. Apparatus for solving equations, comprising, in combination, a table, a series of parallel, straight lines thereon, said lines being spaced to represent values of a given function of the unknown, one of said lines being the origin of the series, a fixed curve on the table graduated to represent values of a given function of the first variable, the origin of the graduations on the curve being on the origin of the series, a fixed rule positioned parallel to said straight line origin of the series, a first and a second smaller rule, graduated to represent values of the different functions of various variables, the origin of the graduations on said second smaller rule being movable along the said straight line origin of the series, a slide mounted on said first smaller rule and slidable the length of the rule, said second smaller rule being pivoted on said slide, and said first smaller rule being movable along the length of the curve.

2. Apparatus for the graphic solution of equations, comprising, a table, a series of parallel straight lines thereon, one of which is the origin of the series, a circular arc thereon graduated to represent angles, the center of said arc, and the origin of the graduations thereon being on the straight line origin, a graduated rule, pivoted at one end at the center of said arc, a fixed rule positioned parallel to the straight line origin, a slide member positioned on, and slidable the length of said graduated rule, said slide pivotally carrying a second graduated rule, one end of which is movable along the fixed rule.

3. An apparatus according to claim 1, said fixed rule being spaced from the straight line origin, said second smaller rule carrying a supporting shoulder at its end, said shoulder being in the form of a circular sector having its center at the zero of the graduations on the rule, and a radius equal to the distance between the straight line origin of the series and said fixed rule.

In witness whereof I have hereunto set my hand in the presence of two witnesses.

HALVOR HANSSON.

Witnesses:
 DAGNY SYVERSEN,
 M. NOKAHRS.